(12) United States Patent
Lumini

(10) Patent No.: US 11,772,441 B2
(45) Date of Patent: Oct. 3, 2023

(54) MOTOR VEHICLE

(71) Applicant: FERRARI S.p.A., Modena (IT)

(72) Inventor: Sandro Lumini, Modena (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 17/937,004

(22) Filed: Sep. 30, 2022

(65) Prior Publication Data

US 2023/0110766 A1    Apr. 13, 2023

(30) Foreign Application Priority Data

Oct. 13, 2021   (IT) .......................... 102021000026189

(51) Int. Cl.
B60G 3/18    (2006.01)
B62D 25/16    (2006.01)

(52) U.S. Cl.
CPC .............. B60G 3/18 (2013.01); B62D 25/16 (2013.01)

(58) Field of Classification Search
CPC .. B62D 25/186; B62D 25/182; B62D 25/163; B62D 25/16; B60G 3/18
See application file for complete search history.

(56) References Cited

U.S. PATENT DOCUMENTS

| | | | |
|---|---|---|---|
| 1,774,242 A * | 8/1930 | Schneider | B62D 25/186 280/157 |
| 1,989,368 A * | 1/1935 | Knapp | B62D 25/182 280/849 |
| 2,010,350 A | 8/1935 | Davis | |
| 5,511,808 A * | 4/1996 | Rowland | B62D 25/163 280/847 |
| 6,007,102 A * | 12/1999 | Helmus | B62D 25/182 280/847 |
| 8,388,003 B2 * | 3/2013 | Wellman | B62D 25/186 280/847 |
| 9,603,305 B2 * | 3/2017 | Rau | B62D 25/16 |
| 10,400,422 B2 * | 9/2019 | Angelo | B62D 25/163 |
| 2008/0029989 A1 * | 2/2008 | Griffiths | B62D 25/163 280/154 |
| 2011/0080019 A1 * | 4/2011 | Castillo | B62D 25/16 296/180.1 |

(Continued)

FOREIGN PATENT DOCUMENTS

| | | |
|---|---|---|
| EP | 3549846 A1 | 10/2019 |
| JP | 2009234331 A | 10/2009 |

OTHER PUBLICATIONS

JP2009234331A machine translation from espacenet.com (Year: 2023).*

(Continued)

Primary Examiner — Paul N Dickson
Assistant Examiner — Maxwell L Meshaka
(74) Attorney, Agent, or Firm — CANTOR COLBURN LLP

(57) ABSTRACT

A motor vehicle includes a body, a wheel hub unit, an upright, which is fixed to the wheel hub unit, a fender, which is arranged to cover the wheel hub unit, and a suspension, which couples the upright to the body in a movable manner along at least one axis, which is transversal to a driving direction of the motor vehicle; wherein the suspension comprises at least one movable element, which is movable along said axis, and wherein the fender is carried by said element in a movable manner relative to the body.

11 Claims, 2 Drawing Sheets

(56) References Cited

U.S. PATENT DOCUMENTS

| | | | | |
|---|---|---|---|---|
| 2012/0080908 | A1* | 4/2012 | Wellman | B62D 25/186 |
| | | | | 293/11 |
| 2015/0299982 | A1* | 10/2015 | Angelo | E02F 9/0858 |
| | | | | 280/154 |
| 2016/0128278 | A1* | 5/2016 | Rau | B62D 25/16 |
| | | | | 293/58 |

OTHER PUBLICATIONS

Search Report for Italian Application No. 102021000026189 completed May 2, 2022.

* cited by examiner

MOTOR VEHICLE

CROSS-REFERENCE TO RELATED APPLICATIONS

This patent application claims priority from Italian patent application no. 102021000026189 filed on Oct. 13, 2021, the entire disclosure of which is incorporated herein by reference.

TECHNICAL SECTOR

The invention relates to a motor vehicle, for example a sports car, and—more specifically—to the configuration of its fenders.

PRIOR ART

The fenders of a motor vehicle normally are rigidly fixed to the body, so as to cover the wheels at a distance from them that is such as to exclude possible interferences with the movement thereof enabled by the suspensions while the motor vehicle is driving.

Even though the above-mentioned configuration of the fenders undoubtedly is simple and effective, it generates anyway a plurality of drawbacks.

A first drawbacks lies in the designing limits arising from having to ensure the absence of contact between the wheels and the fenders during the use of the vehicle.

A further drawbacks relates to the stability of the vehicle, which is negatively affected by the variability of the relative position between the wheels and the respective fenders; indeed, the aerodynamic force acting upon the motor vehicle changes as the relative position changes, thus disturbing stability.

Another drawbacks is correlated with the height of the fenders from the ground, which, in turn, is negatively correlated with the driver's visibility, especially when the height of the seat from ground is relatively low, which typically is the case with sports cars.

Owing to the above, known motor vehicles have to be improved, in particular overcoming or moderating the drawbacks discussed above.

According to some solutions of the prior art, the fenders are rigidly fixed to the uprights of the wheels, instead of being fixed to the body.

However, these solutions turned out to be not sufficiently satisfying because of further drawbacks introduced.

In particular, in case of steering wheels, the fenders fixed to the uprights rigidly rotate together with the wheels with respective to axes that are transversal to the ground, hence causing aerodynamic perturbations that are negative for the stability of the motor vehicle.

Moreover, the fenders fixed to the uprights must necessarily have small dimensions in order to minimize the aforesaid aerodynamic perturbations.

Therefore, these further drawbacks also need to be overcome.

The object of the invention is to fulfil at least one of the needs discussed above, preferably in a simple fashion.

DESCRIPTION OF THE INVENTION

Said object is reached by a motor vehicle as defined in claim 1.

The dependent claims define special embodiments of the invention.

BRIEF DESCRIPTION OF THE DRAWINGS

Hereinafter, an embodiment of the invention will be described, in order to allow the latter to be better understood, by way of non-limiting example and with reference to the accompanying drawings, wherein.

EMBODIMENTS OF THE INVENTION

Figure 1:
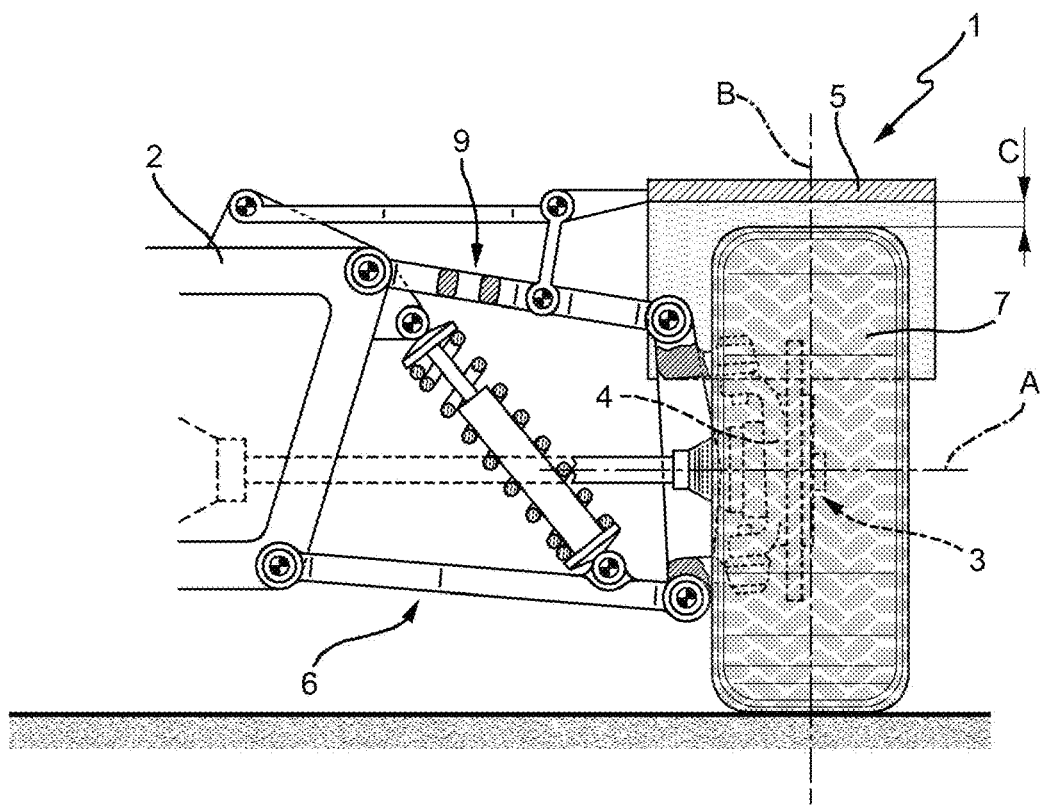
FIG. 1 is a front view of a portion of a motor vehicle according to the invention.

In FIG. 1, reference number 1 is used to indicate, as a whole, a motor vehicle.

The motor vehicle 1 comprises a body 2, a wheel hub unit 3, an upright 4, a fender 5 and a suspension 6.

The wheel hub unit 3 is configured to support a wheel 7 in a rotary manner around a wheel axis A, which, in particular, is horizontal and transversal to a driving direction of the motor vehicle 1.

Specifically, the wheel 7 is a steering wheel, even though it does not necessarily have to be for the purposes of the invention.

The upright 4 is fixed to the wheel hub unit 3 and is further coupled to the body 2 in a movable manner relative to the latter through the suspension 6.

Figure 3:
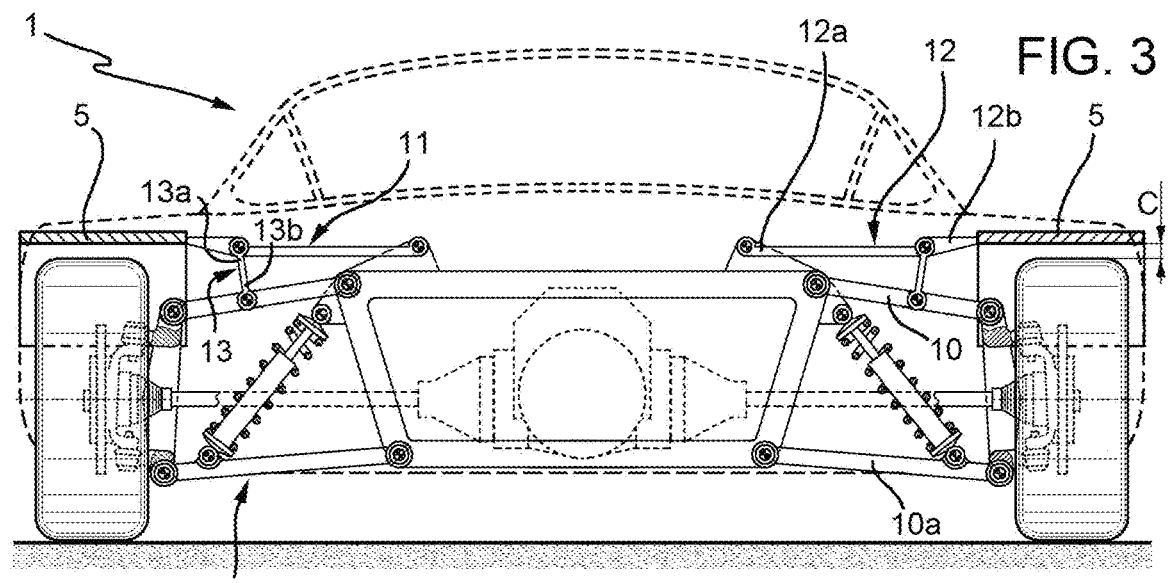
FIGS. 3, 4, 5 are front views of the motor vehicle in respective distinct operating configurations.
Figure 4:
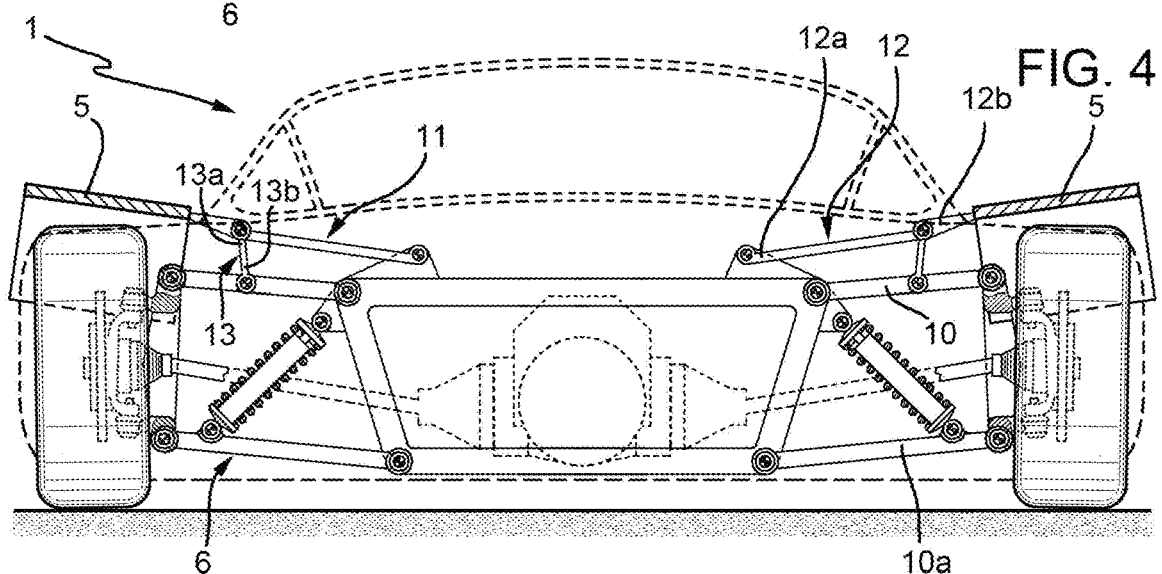
Figure 5:
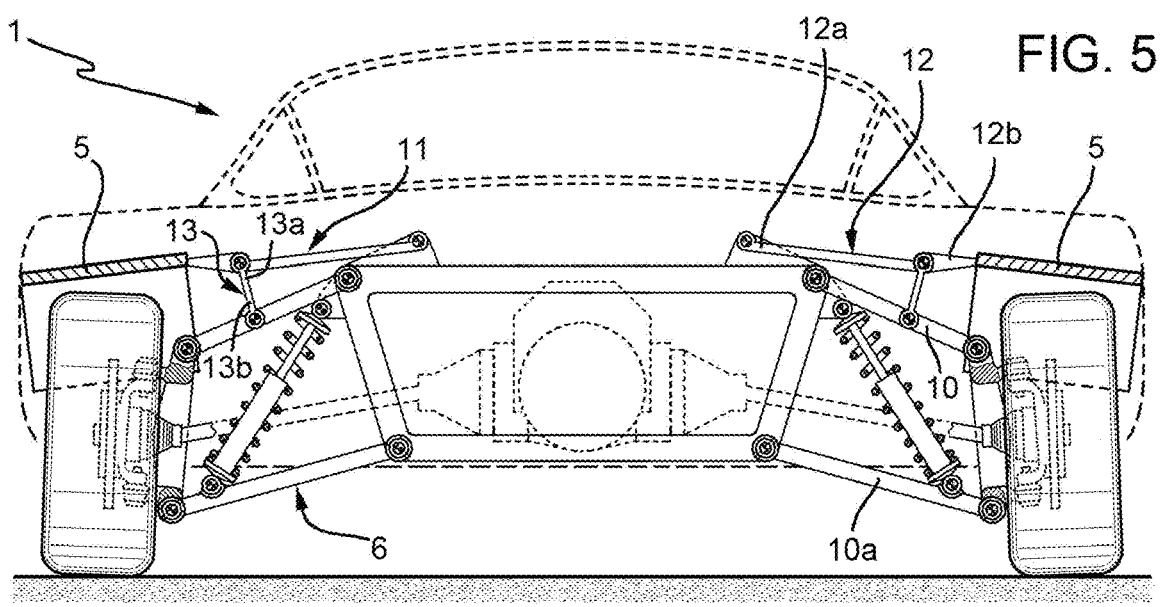

The suspension 6 allows the upright 4 to make movements along at least one axis B, which is transversal to the driving direction, for example is vertical and, hence, orthogonal to the driving direction, as shown in FIGS. 3, 4, 5.

Specifically, the suspension 6 is an independent suspension, even though this is not necessary.

In the figures, the suspension 6 is represented as a four-link suspension, though without losing in generality.

As a matter of fact, the suspension 6 could be of any different type, including Mc Pherson suspensions, multi-arm suspensions, etcetera.

Anyway, the suspension 6 comprises at least one element 9, specifically comprising or, more precisely, defined by a suspension arm 10, which is movable along the axis B, in particular relative to the body 2.

Therefore, the suspension 6 couples the upright 4 to the body 2 in a movable manner along the axis B.

In the embodiment shown herein, the suspension 6 comprises a further suspension arm 10a movable along the axis B relative to the body 2.

The arm 10a completes, together with the arm 10, the four-bar linkage of the suspension 6.

More precisely, the arm 10 and, if necessary, the arm 10a, when present, have respective ends hinged to the upright 4.

Furthermore, the arm 10 and, if necessary, the arm 10a, when present, preferably have respective ends opposite the previous ones and hinged to the body 2.

Specifically, the arm 10 is arranged above the arm 10a.

The fender 5 preferably has the function of preventing loose material of different types, such as rocks, sand, mud an the like, from shooting up, more precisely upwards, thus protecting vehicles and people around, as well as the body 2.

Aside from that, the fender 5 also has other functions that are independent of one another, such as for example an aerodynamic function, to reduce, in particular, the aerodynamic resistance of the motor vehicle 1, and/or an air conveying function, for example to lead air to a radiator.

If necessary, the fender 5 could have merely aesthetic purposes.

Generally speaking, for the sake of clarity, the fender 5 is a component that covers the wheel 7 from above. In other words, the fender 5 is arranged above the wheel 7. For example, the fender 5 does not include portions facing the wheel 7 along the axis of the wheel 7, namely according to a direction that is orthogonal to the axis of the wheel 7. In particular, the fender 5 is manufactured as one single piece.

Preferably, the fender 5 is circumferentially arranged around the wheel 7 or extends around the wheel 7, i.e. around the axis of the wheel 7.

The fender 5 is arranged so as to cover the wheel 7, namely above the latter, at a distance C therefrom, in particular measured in a vertical direction, namely according to the axis B.

As a consequence, the fender 5 also covers the wheel hub unit 3, since it is arranged above it at a further distance, which is not shown herein, but corresponds to the distance C.

According to the invention, the fender 5 is carried by the element 9 or by the arm 10 in a movable manner relative to the body 2.

In other words, the fender 5 follows the movement of the element 9 or of the suspension 6, even though not necessarily in a rigid or integral manner.

In this way, in use, the distance C is much less variable relative to a case with a fender that is fixed to the body 2; the distance C could even be constant, based on the design of the suspension 6 and/or on the coupling of the fender 5 to the element 9.

More in detail, the motor vehicle 1 comprises an articulated mechanism or linkwork 11, through which the fender is coupled to the element 9 or arm 10.

Specifically, the mechanism 11 is flat, so that all the points thereof define trajectories lying on planes that are parallel to one another.

In particular, the planes are orthogonal to the driving direction of the motor vehicle 1, namely vertical.

The mechanism 11 can basically be schematically represented by a plurality of rods or arms on one of the planes, as substantially shown in FIGS. 3, 4, 5.

In this way, the fender 5 only follows the movements of the wheel 7 or of the wheel hub unit 3 parallel to the planes, namely, more precisely, the vertical movements of the wheel 7 or of the wheel hub unit 3.

This means that all points of the fender 5 follow trajectories lying on said planes.

From another point of view, the position of the fender 5 does not change based on the steering, namely is independent thereof.

Figure 2:
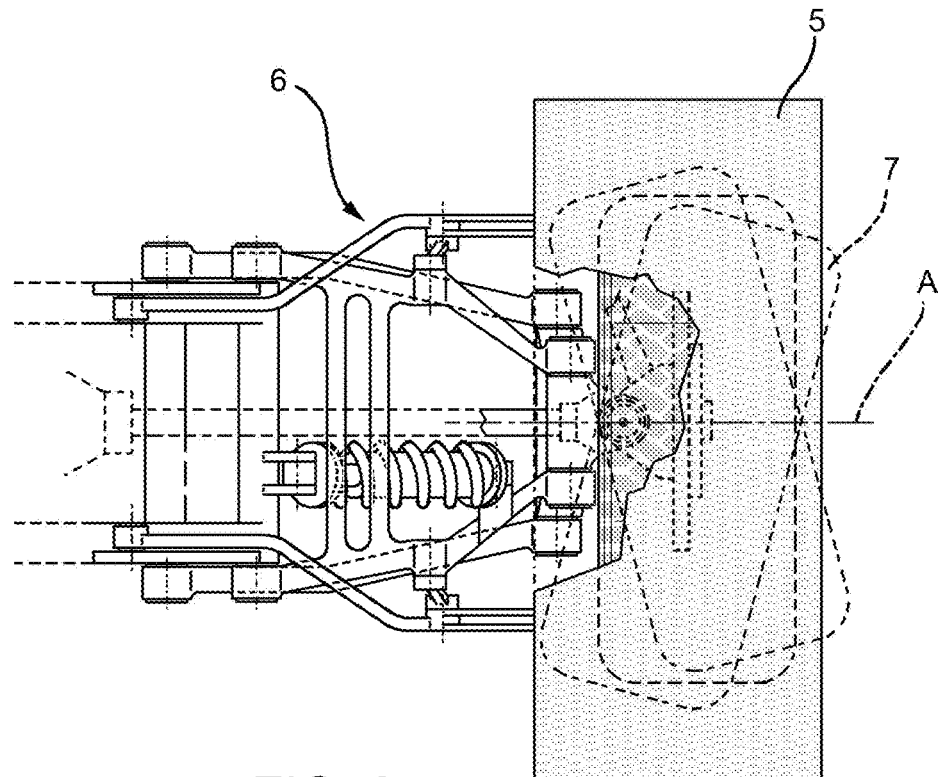
FIG. 2 is a view from the top of the portion of FIG. 1.

This is particularly visible in FIG. 2, which shows the wheels 7 in a steered position compared to the other figures, without the fender 5 having made movements following the steering of the wheels 7.

According to a particular example of the mechanism 11, it forms or comprises a four-bar linkage to which the fender 5 is directly coupled.

With reference to the embodiment of FIGS. 3, 4, 5, the mechanism 11 comprises a rod or arm 12, which carries the fender 5.

In particular, the fender 5 is directly coupled to the arm 12.

The arm 12 is preferably hinged to the body 2. For the sake of clarity, the term "hinged" identifies a hinge, namely a link that prevents the arm 12 from translating relative to the body 2. In other words, the term "hinged" implies that the arm 12 can only rotate relative to the body 2, more precisely around a hinge axis. More in particular, the arm 12 is directly hinged to the body 2 or is hinged at the body 2.

More precisely, the arm 12 has two ends 12a, 12b, which are connected to the body 2 and to the fender 5, respectively.

In particular, the end 12a is hinged to the body 2, more in particular directly to or at the body 2.

Furthermore, the mechanism 11 comprises a rod or arm 13 having two ends 13a, 13b hinged to the arm 12 and to the element 9 or arm 10, respectively.

In particular, the end 13a is arranged in an intermediate position between the ends 12a, 12b. More in particular, the end 13a is arranged between the end 12a and the fender 5.

Similarly, the end 13b is arranged in an intermediate position between the ends of the arm 10.

The arm 13 is arranged between the body 2 and the fender 5.

In the embodiment shown herein, the fender 5 is fixed relative to the arm 12, more in particular is directly fixed to the latter.

Therefore, the relative orientation between the fender 5 and the wheel 7 or wheel hub unit 3 is variable with the movement of the suspension 6.

For example, in at least one operating configuration of the motor vehicle 1, also called normal driving configuration, the fender 5 extends horizontally, namely parallel to the axis A and, therefore, is parallel to the contact patch of the wheel 7.

In another operating configuration, also called extension configuration for the suspension 6, i.e. when the body 2 is lifted compared to the normal driving configuration, the fender 5 extends along a direction leading away from the axis A, in particular upwards.

In yet another different operating configuration, also called compression configuration for the suspension 6, i.e. when the body 2 is lowered compared to the normal driving configuration, the fender 5 extends along a direction leading towards the axis A, in particular downwards.

Clearly, the mechanism 11 could be configured in a different manner, so that the relative orientation and/or the distance C between the fender 5 and the wheel 7 is constant.

For example, the fender 5 could be coupled to the arm 12 by means of a connecting rod and limited to a pure translation along the axis B, thus forming a pushing crank mechanism. In this case, the relative orientation and the distance C between the fender 5 and the wheel 7 would be constant.

Generally speaking, the mechanism 11 can have different structures, including those with a crank and slotted link and/or a crank mechanism, without any specific limitation.

In any case, the fender 5 conveniently has a point that always belongs to a straight line orthogonal to the driving direction and intersecting the wheel hub unit 3. The straight line is parallel to the axis B.

In the operation of the motor vehicle 1, the relative height between the wheel 7 and the body 2 is variable by means of the suspension 6.

FIG. 4 shows a compression configuration for the suspension 6, in particular a maximum compression configuration. Here, the fender 5 has an inner portion according to the axis A, which is close to the wheel 7, and an outer portion according to the axis A, which is far from the wheel 7.

FIG. 3 shows the driving order configuration. Here, the fender 5 extends parallel to the axis A.

FIG. 5 shows an extension configuration for the suspension 6, in particular a maximum extension configuration. Here, the inner portion of the fender 5 is fare from the wheel 7, whereas the outer portion of the fender 5 is close to the wheel 7.

Owing the above, the advantages of the motor vehicle 1 according to the invention are evident.

Since the fender 5 follows the movement of the suspension 6 and, hence, of the wheel 7, the value of the distance C can significantly be reduced, without any risk of interference between the wheel 7 and the fender 5.

This increases the aesthetic value of the motor vehicle 1.

The fact that the variability of the distance C is significantly reduced also leads to a substantial constancy in the aerodynamic resistance of the vehicle 1.

This is advantageous for the stability of the motor vehicle 1 is significantly improved.

Furthermore, the height of the fender 5 can be reduced so as to improve the driver's visibility from the inside of the passenger compartment of the motor vehicle 1.

Finally, the motor vehicle 1 according to the invention can be subjected to changes and variants, which, though, do not go beyond the scope of protection set forth in the appended claims.

The invention claimed is:

1. A motor vehicle (1) comprising:
a body (2),
a wheel hub unit (3),
an upright (4), which is fixed to the wheel hub unit (3),
a fender (5), which is arranged to cover the wheel hub unit (3), and
a suspension (6), which couples the upright (4) to the body (2) in a movable manner along at least one axis (B), which is transversal to a driving direction of the motor vehicle (1);
wherein the suspension (6) comprises at least one movable element (9), which is movable along said axis (B); characterized in that the fender (5) is carried by said element (9) in a movable manner relative to the body (2).

2. The motor vehicle according to claim 1 and further comprising an articulated mechanism (11), through which the fender (5) is coupled to said element (9) in an articulated manner.

3. The motor vehicle according to claim 2, wherein the articulated mechanism (11) is planar, whereby all points of the articulated mechanism (11) can only have trajectories lying on parallel planes.

4. The motor vehicle according to claim 3, wherein the planes are orthogonal to the driving direction, in particular vertical.

5. The motor vehicle according to claim 2, wherein the articulated mechanism (11) comprises a first arm (12), which carries the fender (5).

6. The motor vehicle according to claim 5, wherein the articulated mechanism (11) further comprises a second arm (13) comprising two ends (13a, 13b), which are hinged to the first arm (12) and to said element (9), respectively.

7. The motor vehicle according to claim 5, wherein the first arm (12) is hinged to the body (2), so that it is movable relative to the latter.

8. The motor vehicle according to claim 5, wherein the fender (5) is fixed relative to the first arm (12).

9. The motor vehicle according to claim 1, wherein the fender (5) always has at least one point belonging to a straight line, which is orthogonal to the driving direction and intersects the wheel hub unit (3).

10. The motor vehicle according to claim 1, wherein said element (9) is defined by a suspension arm (10a) having a first end hinged to the upright (4).

11. The motor vehicle according to claim 10, wherein the suspension arm (10a) has a second end hinged to the body.

* * * * *